United States Patent Office 3,640,925
Patented Feb. 8, 1972

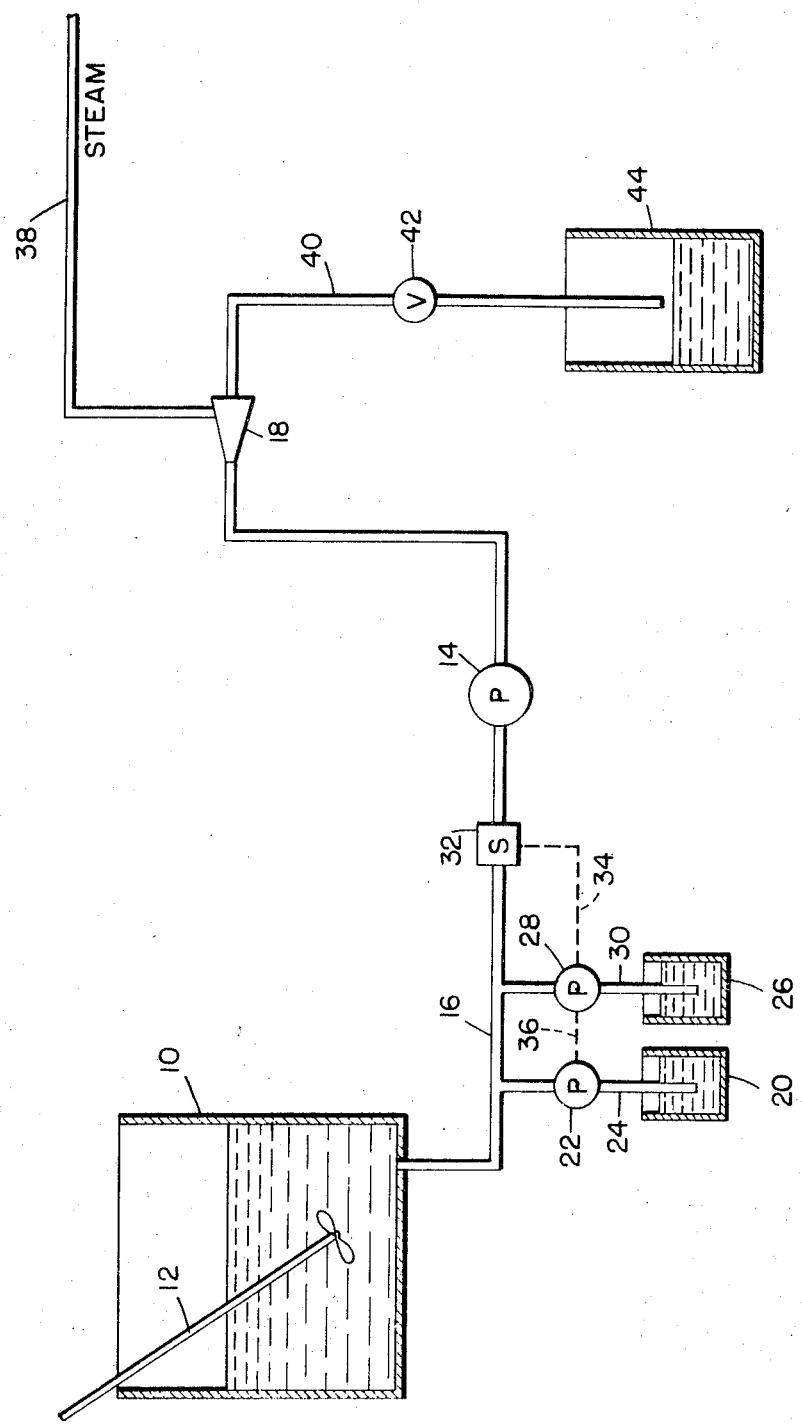

3,640,925
PROCESS FOR THE SIMULTANEOUS GELATINIZA-TION AND GRAFT COPOLYMERIZATION OF MONOMERS ONTO STARCH
Gerald F. Touzinsky, Laurel, and Hans W. Maurer, Ellicott City, Md., assignors to Westvaco Corporation, New York, N.Y.
Filed Oct. 16, 1969, Ser. No. 866,880
Int. Cl. C08f 25/00
U.S. Cl. 260—17.4 GC          16 Claims

ABSTRACT OF THE DISCLOSURE

Process for simultaneously gelatinizing starch and initiating graft copolymerization between a polymerizable ethylenically unsaturated monomer and starch which includes forming an aqueous dispersion of starch, monomer, and a peroxidic free-radical initiator, and heating the dispersion to substantially instantaneously gelatinize the starch and initiate a graft copolymerization reaction between the monomer and starch.

BRIEF SUMMARY OF THE INVENTION

This invention relates to the preparation of graft-modified starches. More particularly, it relates to a process in which starch is simultaneously gelatinized and reacted with a monomer in a graft copolymerization reaction to produce a starch graft copolymer having properties which are a combination of those of starch and those of a homopolymer obtained from the monomer. The process can be used to prepare improved starches which find great utility in the papermaking process in such areas as wet end addition, size press application, and coating binder application. The improved starches also find utility in other industries, as for example in the textile industry to replace hydrocolloids in adhesives and sizings.

The use of unmodified starch in the papermaking and textile fields is limited due to the general colloidal properties of starch. By combining starch and synthetic polymers through graft copolymerization, products with highly desirable combinations of properties can be produced. In a graft copolymerization process, the starch polymer is combined chemically with a polymerizable monomer in the presence of the starch polymer.

Starch modification treatments, including graft copolymerization, are usually performed on starch in its granular state by the starch manufacturer. Such commercially modified starches, which must be reslurried and pasted or gelatinized at the paper or textile mill, command a relatively high price. In the case of starch grafts, the cost is high because of the conventional procedures used which call for purification of the monomer to eliminate polymerization inhibitors, and for the use of oxygen-excluding systems such as nitrogen blankets. Another disadvantage of the granular process is that the graft modifications may drastically alter the gelatinization characteristics of the starch which may require special procedures for preparing starch pastes. Accordingly, a starch graft copolymerization process, which can be employed at the mill site and which produces a pasted, grafted starch product, has long been sought to avoid the cost of commercially modified starches. Since starch is used at the mill in its pasted state, the economics favor its reaction and modification while in the pasted state.

As indicated, starch graft copolymerization processes are known, and most concern treatments of starch in the granular state. Some treatments on already pasted starch are known, but they require cooling of the paste before the graft reaction and use of an inert gas blanket. They are usually very slow processes, some requiring a reaction time of as much as three hours or more. Ordinarily, the processes are initiated by free-radical producing oxidizing systems or irradiation.

In the present invention, a starch graft copolymer is prepared almost instantly by combining gelatinization of the starch with the graft copolymerization reaction. This is accomplished by rapidly heating an aqueous slurry of starch, a polymerizable monomer, and an initiator to or above the gelatinization temperature of the starch and thereby simultaneously gelatinizing the starch and grafting the monomer and polymer formed from the monomer onto the starch. In a continuous manner, this can be accomplished by continuously moving an aqueous dispersion of starch, monomer, and initiator to and through a continuous starch cooker. The dispersion is substantially instantaneously heated in the starch cooker to at least the gelatinization temperature of the starch. The monomer is activated by the free-radical generating initiator and temperature, and substantially instantaneously a grafted starch product is produced while the starch is gelatinizing. The reaction mixture is then continuously passed to a receiving zone or may be passed to a holding tank before being passed to the receiving zone.

In practice, the starch has been pasted at temperatures ranging from about 190° F. to about 340° F., and preferably from about 270° F. to 320° F., which temperatures are well above the gelatinization range of starches used in the paper industry. The total time for the continuous process, measured from entrance into the cooker to entrance into the product receiver, has varied from about 1 to 15 seconds, but the time may be longer when additional starch viscosity reduction by oxidation and hydrolysis is desired. For batch cooks, the time measured from placing the reaction dispersion in a heated environment to removing the reaction products therefrom has varied up to about 15 minutes, depending upon the rate of heating to gelatinization.

Starch cookers of known type have been employed for purposes of the novel process. Cookers, in which live steam is injected into the starch slurry, such as that shown in U.S. Pat. 3,219,483, have been found most useful. Other types of continuous starch cookers, which operate with indirect heating techniques, can also be employed.

The starch to be converted is preferably a pearl starch, and the starch is preferably corn starch. However, any starch capable of being reacted in a graft copolymerization reaction and which is useable in wet end additions, sizings, and paper coating compositions, can be used in practicing this invention. Starch slurries, having a solids content up to about 43 percent, have been utilized in the present invention, with the preferred starch solids content ranging from about 1 to 35 percent depending upon the end use of the paste.

The graft copolymerization initiator is preferably a peroxidic free-radical generating initiator and can be, for example, hydrogen peroxide in its free state as a solution in water or in a dry state bound to an inorganic salt, such as the perborates, or bound to organic materials, such as urea, or other free-radical generating reagents such as persilicates, percarbonates, persulfates, and organic peroxides. Metallic salts, such as copper sulfate, ferrous sulfate, manganese sulfate, and nickel nitrate have been used as co-initiators or activators with the per compounds, and it is obvious that many other metallic ions may also be used to aid free-radical generation by the per compounds. The preferred initiator system comprises cupric sulfate and hydrogen peroxide. The amount of metallic salt used has varied up to about 0.1% based on the weight of dry starch, and the amount of peroxidic initiator used has varied up to about 1.5% based on the weight of dry starch. Obviously, larger quantities of initiator can be used to effect further starch degradation and to effect efficient grafts when large amounts of monomer are used.

The preferred monomers for purposes of the present starch graft copolymerization processes are polymerizable ethylenically unsaturated monomers, particularly the acrylic and vinyl monomers. By acrylic monomers is means such monomers as acrylic acid; esters of acrylic acid such as ethyl acrylate and 2-ethylhexyl acrylate; methacrylic acid; esters of methacrylic acid such as methyl methacrylate, N,N-dimethylaminoethyl methacrylate, t-butylaminoethyl methacrylate, octadecyl methacrylate, and 3 - trimethylammonium - 2-hydroxypropyl methacrylate chloride; acrylamide; substituted acrylamides such as N-tert. butyl acrylamide and N-methylol acrylamide; methacrylamide; substituted methacrylamides such as N-methyl methacrylamide; acrylonitrile; and methacrylo nitrile. Acrylic monomers also include the above-noted esters and amides in which the substituting group is attached to more than one polymerizable group as, for example, trimethylolpropane trimethacrylate and methylene bis acrylamide. Also included are other substituted acrylic acids such as crotonic acid, maleic acid, and itaconic acid, as well as esters thereof. Any of the many vinyl monomers adaptable for graft copolymerization work may be employed. For example, vinyl ethers such as cetyl vinyl ether and octyl vinyl ether; vinyl esters such as vinyl acetate, vinyl stearate, and other homologs; and styrene and substituted styrenes such as methyl vinyl benzene and t-butyl vinyl benzene, have been found to be suitable for producing starch-vinyl graft copolymers according to the present invention. Obviously, mixtures of the various monomers may be used to produce graft copolymers by the present invention.

The graft copolymerization reaction is substantially complete when the starch leaves the starch cooker. The properties of the resultant pastes differ strongly in gel characteristics and physical appearance from pastes processed without monomer. Extraction tests have shown that the monomer is chemically bound to the starch and in most instances has been depeleted during the reaction.

As will be apparent to those skilled in the art, the graft copolymerization process of this invention is accompanied by oxidation and hydrolysis of the starch which can be controlled in degree by adjusting the amount of oxidant used, conversion temperature, and reaction time. Increasing these variable will provide increased fluidity of the reaction products. In general, the lower viscosity products produced by the present processes find utility in paper coating compositions as binders, and in textile and paper sizings, while the higher viscosity products are useful as wet-end additive, adhesives, and as gum substitutes.

BRIEF DESCRIPTION OF THE DRAWING

The accompanying drawing is a diagrammatic illustration of apparatus which can be employed to practice the continuous process of this invention.

DETAILED DESCRIPTION

The invention will be best understood by reference to the following illustrative examples and to the drawing.

Example 1

About five grams of unbuffered pearl corn starch were dispersed in about 95 g. of water, and to the dispersion were added about 0.08 ml. of 1% aqueous solution of $CuSO_4 \cdot 5H_2O$ (0.75 mg., 0.015% based on the weight of dry starch) and about 0.5 g. of acrylamide (10% based on the weight of dry starch). The starch slurry was then placed in a boiling water bath, stirred with a magnetic stirrer, and 0.5 ml. of 3% hydrogen peroxide solution (0.3% $H_2O_2$ based on the weight of dry starch) was immediately added. The reaction mixture was cooked for about 10 minutes, during which time the starch gelatinized and the graft copolymerization reaction was initiated and completed. The grafted starch-acrylamide copolymer product, in paste form, was suitable for use as the binder in a paper coating composition.

For laboratory examination of the product, the grafted starch-acrylamide copolymer was cooled to room temperature and freezed dried. The total yield was about 5.1 g.; yield from the same amount of starch processed without monomer was about 4.5 g., indicating in the case of the graft copolymer a graft yield of about 100%.

Examples 2–11

Other batch runs were made as above with various monomers or mixtures of monomers to produce various graft copolymers. These runs were similar in all respects to that set out in Example 1, except that the following monomers, in the amounts indicated, were used in place of acrylamide, and in Examples 3 and 11, 2.0 ml. in 1 N HCl were added to the starch dispersion before the monomers were added, and in Example 10, 4.3 ml. of 1 N NaOH were so added, to neutralize the monomers:

| Example | Monomer | Amount of Monomer, g. |
| --- | --- | --- |
| 2 | Methyl methacrylate | 0.45 |
| 3 | Dimethylaminoethyl methacrylate | 1.85 |
| 4 | 3-trimethylammonium-2-hydroxypropyl methacrylate | 0.7 |
| 5 | Octadecyl methacrylate | 0.45 |
| 6 | t-Butylaminoethyl methacrylate | 0.45 |
| 7 | Cetyl vinyl ether | 1.64 |
| 8 | Vinyl acetate | 0.47 |
| 9 | Styrene | 0.45 |
| 10 | Maleic acid | 0.5 |
| 11 | Mixture of: | |
|  | Acrylonitrile | 0.5 |
|  | Dimethylaminoethyl methacrylate | 0.095 |

In each case, a graft copolymer of the starch and monomer or monomer mixture was produced.

Examples 12–13

Example 3 was repeated except that copper sulfate was replaced in Example 12 with 0.1 mg. of ferrous sulfate, and was replaced in Example 13 with 0.1 mg. of nickel nitrate. In each instance, dimethlaminoethyl methacrylate was grafted onto the starch.

Example 14

Example 3 was repeated, except that the initiator was ammonium persulfate in an amount of about 0.0165 g., in place of hydrogen peroxide. No metallic co-initiator was used in Example 14. In this case, a starch graft of dimethylaminoethyl methacrylate was produced. The graft yield was about 87%.

Example 15

Referring now to the drawing, a continuous process, forming the preferred embodiment of the invention, will be described.

Sufficient amounts of unbuffered pearl corn starch and water were introduced into slurry tank 10 and were mixed by agitator 12 to provide a 20% solids content starch slurry. To the slurry was added a sufficient amount of 1.0% aqueous $CuSO_4 \cdot 5H_2O$ at a rate to provide about 0.015% copper sulfate by weight based on the starch. Delivery pump 14, preferably a positive displacement pump, moved the starch slurry through conduit 16 from slurry tank 10 to the continuous starch cooker 18, preferably of the types shown in U.S. Patent 3,219,483, at a flow rate of about 0.3 gallon per minute. En route to the cooker 18, additions of monomer and initiator were made to the starch slurry. A 50% aqueous solution of acrylamide was provided in the monomer supply container 20. The acrylamide solution was moved by metering pump 22 through conduit 24 from container 20 to the starch slurry in conduit 16. The acrylamide was supplied to the starch slurry at a rate of about 10% dry acrylamide based on the weight of dry starch. As initiator, a 30% aqueous hydrogen peroxide solution was provided in the initiator supply container 26. The initiator solution was moved by metering pump 28 through conduit 30 from container 26 to the starch slurry in conduit 16. The initiator was supplied to the starch slurry at a rate of about 0.3% dry hydrogen peroxide based on the weight of dry starch.

Conduit 16 was also provided with an electromagnetic flow switch 32 which initiated or stopped the operation of metering pumps 22 and 28 in known manner. When delivery pump 14 was operating, switch 32 activated metering pumps 22 and 28 via the control system indicated generally by dotted lines 34 and 36. When the delivery pump 14 was inactive, switch 32 shut down the operation of metering pumps 22 and 28.

The starch slurry, with the monomer and initiator, was passed into starch cooker 18. Steam was fed from a suitable source through steam line 38 into the starch cooker 18. In the cooker 18, live steam was injected directly into the slurry, raising the temperature of the starch slurry to about 312° F., to paste the starch and initiate graft copolymerization. The pasted and reacted starch passed from cooker 18 through conduit 40, equipped with back pressure valve 42, to receiving tank 44. The back pressure during the process was about 65 p.s.i.g. The time for the starch flow, measured from entrance into cooker 18 to exit of the starch from conduit 40, was about 5 seconds.

The grafted starch product was a heavy paste containing about 13% solids. The nitrogen content of the freeze dried product was about 1.7%, indicating a graft yield of about 94%. When diluted with water to about 6% solids, the starch paste was suitable for use as a sizing for paper and produced a sized paper having higher wax pick strength than paper sized with untreated starch.

It is obvious that a holding tank may be provided between the jet cooker 18 and the back pressure valve 42, to provide additional time for starch degradation in addition to graft copolymerization. It has been found that such a tank is not essential, but it may be desirable in some instances to insure the desired degree of viscosity reduction. When a holding tank has been used, the total reaction time has been extended up to about 6 minutes.

Examples 16–19

The process as described in Example 15 was repeated except that other monomers were used in place of acrylamide. In Example 16, methyl methacrylate was supplied from container 20 to the flowing starch in conduit 16 at a rate of about 9.4% dry monomer based on the weight of dry starch. In Example 17, dimethylaminoethyl methacrylate, neutralized with 1 N HCl, was likewise supplied to the flowing starch at a rate of about 9.3%; in Example 18, acrylonitrile was supplied at a rate of about 8.0%; and in Example 19, acrylic acid was supplied at a rate of about 4.0%. In each instance, a starch graft copolymer was produced continuously.

The properties of the starch pastes produced in Examples 1–19 differed strongly in physical appearance and gel characteristics from those of starch processed without monomer. The solubility characteristics of the native starch were changed. For example, the starch was rendered more hydrophilic by grafting a hydrophilic monomer, such as acrylamide or acrylic acid, onto the starch, while the starch was rendered more hydrophobic by grafting on hydrophobic monomers such as methyl methacrylate and acrylonitrile. Colloidal charge, as measured by a conventional Waters Associates Streaming Current Detector, varied according to the monomer used in the graft copolymerization. For example, the dimethylaminoethyl methacrylate grafts gave a positive charge and the acrylamide grafts gave a more negative charge than starch.

Many of the properties of the starch grafts depend upon the monomer grafted. Methyl methacrylate introduces hydrophobic and oleophilic characteristics into the starch polymer. The product can be rendered sufficiently water insoluble to precipitate completely from solution. Lesser modification with methyl methacrylate gives a paste forming a heat reversible gel on cooling. This same product forms a relatively stable emulsion with hexane. Octadecyl methacrylate gives a starch product with a slippery, waxy feel even when isolated by freeze-drying. Acrylamide gives strength and cohesion to the starch as shown by data on paper coating compositions containing the starch graft as binder. Dimethylaminoethyl methacrylate, having a tertiary amino group, imparts a cationic charge to starch. Acrylonitrile grafts give starch a surprising resistance to biological degradation. One sample at 3% paste was exposed to air and repeatedly inoculated with mold from other starch samples over a period of two months without any evidence of biological growth. Some inhibition would be expected from the copper present, but the corresponding starch processed without monomer was strongly attacked within a week.

All of the above starch grafts find utility in the papermaking process. For example, starch grafted with dimethylaminoethyl methacrylate at increasing levels shows increasing pigment retention and strength similar to cationic and cationized starches when added at the wet end of a paper machine. In coating applications, acrylamide grafted starch, used as the sole binder in a paper coating composition containing the graft as 20% binder on clay, showed a strength increase over starch processed without monomer. Acrylonitrile and methyl methacrylate grafted starches show improvements in wet pick resistance over unmodified starch. For example, starch grafted with 10% dimethylaminoethyl methacrylate, used as a 0.25% solids starch paste, was added to the headbox of a paper machine at the rate of 7½ pounds per ream of paper produced. The pulp was a sulfate pulp of blended pine and hardwoods. Compared to unmodified starch added at the same rate, the starch-graft provided the paper with equal burst, tear, and fold and with improved wet pick resistance, filler retention, and opacity.

The processes described herein for making starch grafts fit into current mill practice. The processes are practical without need for purification of the monomer or for excluding air or oxygen from the reactions by use of a nitrogen blanket or other means. Both of these steps are necessary in conventional grafting procedures and contribute to their costs.

It is obvious that many variations may be made in the processes and products just described without departing from the spirit of the invention.

We claim:
1. The process of producing starch graft copolymers which comprises the steps of:
 (a) forming an aqueous dispersion containing up to about 43% starch by weight, water, a polymerizable ethylenically unsaturated monomer selected from the group consisting of acrylic monomers and vinyl monomers and vinyl monomers, said monomer being present in an amount up to about 37% by weight of the starch, and a peroxidic free-radical initiator,
 (b) and rapidly heating the aqueous dispersion to a temperature between about 190° F. and 340° F. to substantially instantaneously paste the starch and simultaneously initiate graft copolymerization between the pasted starch and the monomer.
2. The process of claim 1 in which the aqueous dispersion formed in step (a) thereof also contains an inorganic salt of a metallic ion selected from the group consisting of copper, nickel, manganese and iron.
3. The process of claim 2 in which the monomer is an acrylic monomer.
4. The process of claim 3 in which the acrylic monomer is selected from the group consisting of acrylic acid, substituted acrylic acids, esters of acrylic acid, methacrylic acid, esters of methacrylic acid, acrylamide, substituted acrylamides, methacrylamide, substituted methacrylamides, acrylonitrile, and methacrylonitrile.

5. The process of claim 2 in which the monomer is a vinyl monomer.

6. The process of claim 5 in which the vinyl monomer is selected from the group consisting of vinyl esters, vinyl ethers, styrene, and substituted styrenes.

7. The continuous process of producing starch graft copolymers which comprises the steps of:
   (a) forming an aqueous dispersion containing up to about 43% starch by weight and water;
   (b) adding to the aqueous dispersion
       (i) a polymerizable ethylenically unsaturated monomer selected from the group consisting of acrylic monomers and vinyl monomers, said monomer being present in an amount up to about 37% by weight of the starch;
       (ii) and a periodic free-radical initiator;
   (c) flowing the aqueous dispersion to a reaction zone;
   (d) heating the aqueous dispersion substantially instantaneously in the reaction zone to a temperature of between 190° F. and 340° F. to substantially instantaneously paste the starch and simultaneously initiate graft copolymerization between the pasted starch and the monomer;
   (e) and flowing the grafted starch product to a receiving zone.

8. The process of claim 7 which includes the step of adding an inorganic salt of a metallic ion selected from the group consisting of copper, nickel, manganese and iron to the starch dispersion before step (b) thereof.

9. The process of claim 8 in which in step (b) thereof, the monomer and the initiator are separately and continuously added in metered amounts to the aqueous starch dispersion.

10. The process of claim 9 in which the monomer is an acrylic monomer.

11. The process of claim 10 in which the acrylic monomer is selected from the group consisting of acrylic acid, substituted acrylic acids, esters of acrylic acid, methacrylic acid, esters of methacrylic acid, acrylamide, substituted acrylamides, methacrylamide, substituted methacrylamides, acrylonitrile, and methacrylonitrile.

12. The process of claim 9 in which the monomer is a vinyl monomer.

13. The process of claim 12 in which the vinyl monomer is selected from the group consisting of vinyl esters, vinyl ethers, styrene, and substituted styrenes.

14. The process of claim 9 in which the initiator is added at a rate to provide up to about 1.5% of the initiator based on the weight of dry starch in the aqueous dispersion.

15. The process of claim 9 in which the inorganic salt is added at a rate to provide up to about 0.1% of the salt based on the weight of dry starch in the aqueous dispersion.

16. The continuous process of producing starch graft copolymers which comprises the steps of:
   (a) forming an aqueous dispersion containing starch, water, and an inorganic salt of a metallic ion consisting of cupric sulfate;
   (b) flowing the aqueous dispersion towards a reaction zone;
   (c) adding to the flowing dispersion a monomer selected from the group consisting of polymerizable acrylic monomers and polymerizable vinyl monomers, said monomer being present in an amount up to about 37% by weight of the starch;
   (d) adding to the flowing dispersion a free-radical initiator consisting of hydrogen peroxide;
   (e) flowing the dispersion to a heated reaction zone;
   (f) substantially instantaneously gelatinizing the starch and simultaneously initiating graft copolymerization between the gelatinized starch and the monomer by substantially instantaneously heating the aqueous dispersion to a temperature between about 270° F. and 320° F.;
   (g) flowing the grafted starch product to a receiving zone;
   (h) and collecting the grafted starch product at the receiving zone.

References Cited
UNITED STATES PATENTS

| | | | |
|---|---|---|---|
| 3,061,471 | 10/1962 | Brockway et al. | 117—139.5 |
| 3,061,472 | 10/1962 | Brockway | 117—139.5 |
| 3,332,897 | 7/1967 | Ray-Chaudhuri | 260—17.4 |
| 3,372,132 | 3/1968 | Cruz | 260—17.4 |

MELVIN GOLDSTEIN, Primary Examiner

U.S. Cl. X.R.

162—164